UNITED STATES PATENT OFFICE.

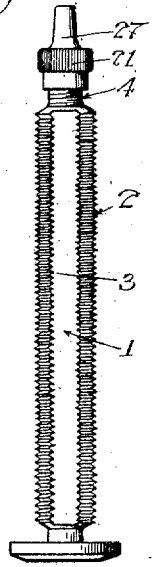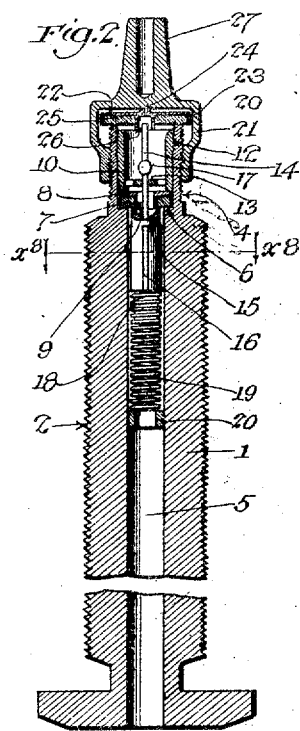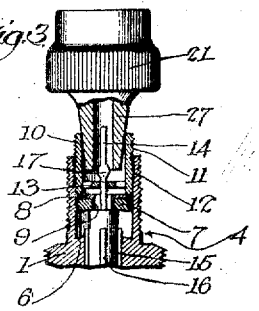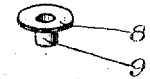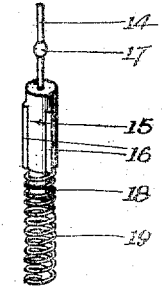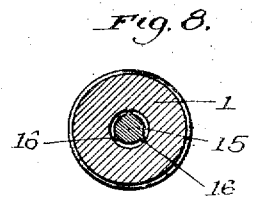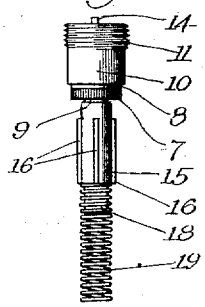

JUNIUS A. BOWDEN, OF LOS ANGELES, CALIFORNIA, ASSIGNOR TO A. SCHRADER'S SON, INCORPORATED, OF NEW YORK, N. Y., A CORPORATION OF NEW YORK.

TIRE-VALVE.

1,205,849.          Specification of Letters Patent.          Patented Nov. 21, 1916.

Application filed May 6, 1913. Serial No. 765,923.

*To all whom it may concern:*

Be it known that I, JUNIUS A. BOWDEN, a citizen of the United States, residing at Los Angeles, in the county of Los Angeles and State of California, have invented a new and useful Tire-Valve, of which the following is a specification.

This invention relates to tire valves and to improvements over valves heretofore invented by me, for which applications have been filed October 21, 1912, Serial No. 727,082, and February 19, 1913, Serial No. 749,548.

The objects of the present invention are to provide the retaining sleeve with a bridge adapted to engage the pin of the valve so that the entire valve, including the retaining sleeve is withdrawn as a unit and the parts are retained together as a unit when withdrawn, thereby avoiding loss of any of the parts and the possibility of disarrangement.

Another object is to provide means for preventing the rubber seat from contracting to close its center orifice and thereby restrict the passage of air.

Another object is to provide a removable cap which is constructed with a revoluble internal disk within which the rubber gasket is confined and the rubber thereby kept from contact with the rotating surface of the outer portion of the cap, so that when the cap is being removed or applied, the rotation of the outer portion of the cap will not come in contact with the rubber to distort the same.

Other advantages will be brought out in the following description.

Referring to the drawings: Figure 1 is a side elevation of the valve. Fig. 2 is an enlarged longitudinal section through the valve. Fig. 3 is a side elevation partly in section of the upper portion of the valve, and showing the cap inverted in position for screwing the valve into or out of position. Fig. 4 is a perspective detail of the retaining sleeve. Fig. 5 is a perspective of the seat supporting disk. Fig. 6 is a perspective of the rubber seat. Fig. 7 is a perspective of the plunger and spring as connected together. Fig. 8 is a section on line $x^8$—$x^8$, Fig. 2. Fig. 9 is a side elevation of the said valve removed as a unit.

1 designates the valve body or casing of the usual construction, with flattened sides 2 and main threaded portion 3 with externally threaded reduced end 4. The casing 1 has a central bore 5 which within the reduced end 4 is enlarged to form a shoulder 6, the latter being guttered as shown, with its inner edge slightly raised to cause a slight indentation in a rubber seat 7, and thereby produce a perfect air closure at this point. The rubber seat 7 is perforated and held in place by a seat retaining disk 8 which is formed with an annular flange 9 extending into the perforated portion of the rubber seat 7 to prevent the seat from contracting the center air hole when it is squeezed between the disk 8 and shoulder 6. Thus the flange 9 maintains the air passage at this point with a uniform area. A retaining sleeve 10 is screwed against the disk 8 to hold the latter and rubber valve seat 7 in position, and the sleeve 10 is provided with external threads 11 for a definite portion of its length, and the reduced portion 4 of the casing 1 is internally threaded at 12 for a definite distance such that when the retaining sleeve 10 is screwed to the lowermost point permitted by these threads, it will exert the proper pressure upon the rubber seat 7 to effect a perfect air closure without undue compression of the rubber.

The retaining sleeve 10 is provided with a bridge 13 preferably integral therewith, and slidably extending through the bridge 13 is a valve pin 14 which carries a valve 15, the upper surface of which is concave as shown, thereby forming an edge which is adapted to slightly indent the rubber seat 7 to form a perfect airtight seat therewith. The pin 14 is driven into the valve 15 with sufficient friction to retain the valve permanently in the desired position, and the valve 15 is provided with a series of longitudinal ribs 16 which slide against the inner wall of the passage 5 and thereby maintain the valve in perfect alinement with the seat 7, insuring a proper fit therewith at all times. The valve 15 is of less diameter than the bore 5 to afford the necessary air passage and the ribs 16 maintain it in central position. The pin 14 is provided with an enlargement 17 above the bridge 13 to cause the pin and valve to be lifted with the sleeve 10 whenever the latter is removed, and to also thereby cause the disk 8 and seat 7 to be likewise removed, they being lifted by the valve 15. The lower end of the valve 15 has a reduced portion 18 to which is secured one end of a compression spring 19, the inner end of the spring 19 bearing against a sleeve 20 which is frictionally retained in the bore 5 of the casing 1, with sufficient friction to form a permanent seat for the inner end of the spring.

The enlargement 17 is at a point sufficiently above the bridge 13 to permit the pin 14 to be displaced the required distance to open the valve 15 for the passage of air past the valve, and it acts to hold all of the parts of the inner valve together, viz., seat 7, sleeve 10, seat supporting disk 8, rubber seat 9, valve 15 and spring 19 so that these parts are all removed as a unit and remain together after being removed. This prevents loss of any of the parts or disarrangement, and enables the valve to be easily reinserted in position and insures the proper relations of the parts when reinserted.

20 is the outer valve cap which is screwed on the reduced threaded portion 4 of the valve casing. The valve cap 20 has an enlarged portion 21 within which is located a plate 22 with an outer depending flange 23, and with a center projection 24 adapted to bear against the center of the inner wall of the enlarged portion 21 and form a pivot upon which the cap 21 turns when being screwed in either direction. A rubber seat 25 is retained in the plate 22 and the plate 22 has a depending center annular flange 26 which prevents the rubber 25 from contracting the size of its center orifice when it is squeezed against the outer rim of the end of the valve casing 1. The perforated portion of the rubber 25 is to receive the outer end of the valve pin 14 when the cap 20 is screwed down tight, and thereby preventing unseating the valve 15.

The cap 20 has a hollow tapered extension 27 which by inserting the cap as shown in Fig. 3, is adapted to be inserted into the retaining sleeve 10 and wedged therein with sufficient friction to turn the retaining sleeve into or out of position by rotating the cap 20. The important advantage of this feature is that while sufficient friction is afforded for screwing the retaining sleeve into its innermost position and place the rubber seat 7 under the requisite tension, that it will automatically slip when such position has been reached and prevent undue pressure being brought to bear upon the parts when screwing the valve into position.

A divisional application Serial No. 87,401 filed March 29, 1916, has been filed for certain subject matter relating to the cap and its combination with the valve.

What I claim is:

1. In a tire valve, a body having an interior bore and an undercut shoulder therein, a removable valve seat in said bore, a valve in said bore adapted to contact with said seat, a retaining sleeve removably secured in said bore for holding said seat in position against said shoulder, and a pin extending from said valve into the retaining sleeve, said retaining sleeve being provided with means for engaging said pin, to cause the valve and seat to be lifted when the retaining sleeve is removed.

2. In a tire valve, a body having an interior bore and an undercut shoulder therein, a removable valve seat in said bore, a valve below said seat and adapted to bear against the seat, a pin on said valve projecting up through said seat, said pin having an enlargement, and a retaining sleeve removably secured in said bore for holding said seat in position against said shoulder, said retaining sleeve having a relatively wide interior and a bridge across its interior through which said pin extends, and adapted to engage the enlargement on said pin.

3. In a tire valve, a body having an interior bore and an internal undercut shoulder, a removable valve resting on said shoulder, a valve bearing against the underside of said seat, a pin on said valve projecting up through said seat, a retaining sleeve screwed in said bore for holding the removable seat in position against said shoulder, said retaining sleeve having a relatively wide interior and a bridge across its interior, and said pin extending through said bridge and having an enlargment above said bridge.

4. In a tire valve, a body having an interior bore and an internal undercut shoulder, a removable valve resting on said shoulder, a valve bearing against the underside of said seat, a pin on said valve projecting up through said seat, a retaining sleeve screwed in said bore for holding the removable seat in position against said shoulder, said retaining sleeve having a relatively wide interior and a bridge across its face, and said pin extending through said bridge and having an enlargment above said bridge, and a disk between said retaining sleeve and removable seat for directly receiving the end thrust of the retaining sleeve.

5. In a tire valve, a body having an interior bore and an internal undercut shoulder, a removable seat resting on said shoulder, a valve bearing against the underside of said seat, a pin on said valve projecting up through said seat, a retaining sleeve screwed in said bore for holding the removable seat in position against said shoulder, said retaining sleeve having a relatively wide interior and a bridge across said interior, said pin extending through said bridge and having an enlargment above said bridge, and a disk between said retaining sleeve and removable seat for directly receiving the end thrust of the retaining sleeve, said disk having an annular flange extending through said removable seat and preventing the inward contraction of said seat, and a square shoulder formed by the under face of the disk and the inner face of the flange.

6. In a tire valve, a body having an interior bore and a undercut shoulder therein, a rubber seat resting against said shoulder, a disk resting against the rubber seat, said seat having a central air passage, said disk having an annular longitudinal flange which projects into said air passage and prevents the inward contraction of the rubber seat, and a square shoulder formed between the under face of said disk and the inner face of the flange, a valve below said seat adapted to close against the seat, a pin projecting from said valve through said air passage, and a retaining sleeve in said bore screwed against said disk for holding said rubber seat against said shoulder, said retaining sleeve having a relatively wide interior and a bridge across said interior, said pin being slidable in said bridge, and having an enlargment on the outer side of the bridge.

In testimony whereof, I have hereunto set my hand at Los Angeles, California, this 25th day of April, 1913.

JUNIUS A. BOWDEN.

In presence of—
GEORGE T. HACKLEY,
F. ALICE CRANDALL.